United States Patent
Hou et al.

(10) Patent No.: US 11,837,722 B2
(45) Date of Patent: Dec. 5, 2023

(54) POSITIVE ELECTRODE MATERIAL FOR LITHIUM ION BATTERY AND PREPARATION METHOD THEREFOR, AND LITHIUM ION BATTERY

(71) Applicant: BEIJING EASPRING MATERIAL TECHNOLOGY CO., LTD., Beijing (CN)

(72) Inventors: Xueyuan Hou, Beijing (CN); Jingpeng Wang, Beijing (CN); Xuequan Zhang, Beijing (CN); Yafei Liu, Beijing (CN); Yanbin Chen, Beijing (CN)

(73) Assignee: Beijing Easpring Material Technology Co., Ltd., Beijing (CN)

( * ) Notice: Subject to any disclaimer, the term of this patent is extended or adjusted under 35 U.S.C. 154(b) by 0 days.

(21) Appl. No.: 18/081,221

(22) Filed: Dec. 14, 2022

(65) Prior Publication Data
US 2023/0122382 A1 Apr. 20, 2023

Related U.S. Application Data

(63) Continuation of application No. PCT/CN2021/112266, filed on Aug. 12, 2021.

(30) Foreign Application Priority Data

Dec. 23, 2020 (CN) .......................... 202011543438.6

(51) Int. Cl.
*H01M 4/505* (2010.01)
*C01G 53/00* (2006.01)
(Continued)

(52) U.S. Cl.
CPC ............ *H01M 4/505* (2013.01); *C01G 53/50* (2013.01); *H01M 4/366* (2013.01); *H01M 4/525* (2013.01);
(Continued)

(58) Field of Classification Search
CPC ....................................................... H01M 4/52
See application file for complete search history.

(56) References Cited

FOREIGN PATENT DOCUMENTS

| CN | 107534140 A | 1/2018 |
| CN | 108123119 A | 6/2018 |

(Continued)

OTHER PUBLICATIONS

Park, Kang-Joon, et al., Improved cycling stability of Li[Ni0.90Co0.05Mn0.05]O2 through microstructure modification by boron doping for Li ion batteries, Advanced Energy Materials, vol. 8, No. 25, pp. 180-202, Jul. 11, 2018.

(Continued)

*Primary Examiner* — Peter F Godenschwager
(74) *Attorney, Agent, or Firm* — Volpe Koenig

(57) ABSTRACT

A positive electrode material for a lithium ion battery and a preparation method therefor, and a lithium ion battery, relating to the technical field of secondary batteries. The positive electrode material comprises a high-nickel multi-element positive electrode material, the high-nickel multi-element positive electrode material is formed by agglomerating multiple primary grains, and the primary grains are distributed in a divergent shape along the diameter direction of the high-nickel multi-element positive electrode material, the aspect ratio L/R of the primary grains in the positive electrode material is greater than or equal to 3, and the radial distribution ratio of the primary grains in the positive electrode material is greater than or equal to 60%. The lithium ion battery containing the positive electrode material has high capacity and greatly improved particle strength.

20 Claims, 3 Drawing Sheets

(51) Int. Cl.
  *H01M 4/36*      (2006.01)
  *H01M 4/525*     (2010.01)
  *H01M 10/0525*   (2010.01)
  *H01M 4/02*      (2006.01)

(52) U.S. Cl.
  CPC ..... *H01M 10/0525* (2013.01); *C01P 2002/52* (2013.01); *C01P 2004/03* (2013.01); *C01P 2004/50* (2013.01); *C01P 2004/54* (2013.01); *C01P 2004/61* (2013.01); *C01P 2004/62* (2013.01); *C01P 2004/64* (2013.01); *C01P 2004/86* (2013.01); *C01P 2006/40* (2013.01); *H01M 2004/021* (2013.01); *H01M 2004/028* (2013.01)

(56) References Cited

FOREIGN PATENT DOCUMENTS

| | | |
|---|---|---|
| CN | 108269974 A | 7/2018 |
| CN | 109244436 A | 1/2019 |
| CN | 109713297 A | 5/2019 |
| CN | 110492064 A | 11/2019 |
| CN | 111952590 A | 11/2020 |

OTHER PUBLICATIONS

Park, J., "Improved Cycling Stability of Li[Ni0.90Co0.05Mn0.05]O2 Through Microstructure Modification by Boron Doping for Li-Ion Batteries", Paper, Advanced Energy Materials, (2018).

POSITIVE ELECTRODE MATERIAL FOR LITHIUM ION BATTERY AND PREPARATION METHOD THEREFOR, AND LITHIUM ION BATTERY

PRIORITY CLAIM & CROSS REFERENCE

The application is a continuation application of International Patent Application No. PCT/CN2021/112266, filed on Aug. 12, 2021, which claims priority to Chinese Application No. 202011543438.6, filed on Dec. 23, 2020, entitled "Positive Electrode Material for Lithium Ion Battery and Preparation Method Therefor, and Lithium Ion Battery", which are specifically and entirely incorporated herein by reference as if fully set forth.

FIELD

The present disclosure relates to the technical field of lithium ion battery, and particularly to a positive electrode material for a lithium ion battery and a preparation method therefor, and a lithium ion battery.

BACKGROUND

The high-nickel ternary positive electrode material $LiNi_{1-x-y}Co_xM_yO_2$ (wherein M is Mn and/or Al) of the lithium-ion battery has been widely researched and used in power batteries, power tools and energy storage in recent years, due to its advantages of high mass specific capacity and volumetric specific capacity. Wherein the maximum defect of the high-nickel ternary positive electrode material at present resides in that the crystal structure has many phase transitions during the charging and discharging process, the volumetric change caused by the phase transitions results in the pulverization of particles.

In order to overcome such a disadvantage, CN109713297A discloses a high-nickel positive electrode material with primary particles being directionally arranged, and preparation method for high-nickel positive electrode material, the method includes: (1) blending: adding a high-nickel positive electrode material precursor, a lithium source and a dopant capable of reducing the surface energy of (003) crystal surface of a layered structure of the high-nickel positive electrode material into a mixing kettle to obtain a mixture; (2) sintering: sintering the mixture to obtain the high-nickel positive electrode material with primary particles being directionally arranged. However, the method requires pre-sintering in advance during the preparation process, which increases the processing difficulty, and it does not perform cladding and optimization in regard to the formed surface structure, thus it can hardly suppress crack growth due to volumetric change of the primary crystalline grains inside the agglomerates after long circulation of the high nickel positive electrode material.

CN110492064A discloses a cathode active material for a lithium secondary battery, a method for preparing the same, and a lithium secondary battery comprising a cathode including the cathode active material; the method includes: subjecting a mixture comprising a lithium source and a metal hydroxide to a first heat treatment in an oxidizing gas atmosphere, to obtain nickel-based active material secondary particles; adding a fluoride precursor to the nickel-based active material secondary particles to obtain a reaction mixture, and performing a second heat treatment on the reaction mixture in an oxidizing gas atmosphere, wherein the second heat treatment is performed at a temperature lower than the first heat treatment. The method prepares the radially distributed secondary particles of the agglomerate by doping the precursor, and imposes a protective effect on the surface by a fluorine coating. However, given that the secondary coating is performed at a low temperature, it can only form protection on the particle surface, and lacks the mutually supportive effect among the primary particles therein, and fails to effectively suppress growth of internal cracks during the charging-discharging cyclic process.

Therefore, it has important significance to research and develop a positive electrode material for a lithium ion battery.

SUMMARY

The present disclosure aims to overcome the defective problem in the prior art with respect to the growth of internal cracks during the long cyclic process of the positive electrode material, and provides a positive electrode material for a lithium ion battery, a method for preparing the same, and a lithium ion battery. The lithium ion battery comprising the positive electrode material has a high capacity and greatly improved particle strength, and exhibits a high battery capacity.

In order to achieve the above objects, a first aspect of the present disclosure provides a positive electrode material for a lithium ion battery, wherein the positive electrode material comprises a high nickel multi-element positive electrode material, which is formed by agglomeration of a plurality of primary crystal particles, and the primary crystal particles are distributed in a diverging shape along a diameter direction of the high nickel multi-element positive electrode material;

wherein the primary crystal particles in the positive electrode material have a length/diameter ratio (L/R) larger than or equal to 3, and the primary crystal particles in the positive electrode material have a radial distribution proportion larger than or equal to 60%.

In a second aspect, the present disclosure provides a method of preparing the aforesaid positive electrode material, including:

(1) contacting the Ni salt, A salt, Co salt with water to obtained a mixed salt solution;

(2) performing a first reaction by contacting the mixed salt solution with a first mixed solution comprising water, a complexing agent and a precipitant in a reaction kettle to obtain a first mixed slurry, and filtering the first mixed slurry to obtain a precursor crystal nucleus;

(3) performing a second reaction by contacting the precursor crystal nucleus, the mixed salt solution with a second mixed solution comprising water, a complexing agent and a precipitant in the reaction kettle to obtain a second mixed slurry, subjecting the second mixed slurry to filtration washing and heat treatment to obtain a precursor;

(4) mixing the precursor, a lithium source and an additive M and subjecting a mixture to a first roasting treatment to obtain a primary sintered material;

(5) blending the primary sintered material with an additive N and subjecting a mixture to a second roasting treatment to prepare a positive electrode material.

In a third aspect, the present disclosure provides a lithium ion battery, wherein the lithium ion battery comprises the aforementioned positive electrode material.

Due to the aforesaid technical scheme, the present disclosure has the following advantages:

(1) The primary crystal particles in the positive electrode material provided by the present disclosure are distributed in a diverging shape along a radial direction, and the primary crystal particles in the positive electrode material have a length/diameter ratio (L/R) larger than or equal to 3, the primary crystal particles in the positive electrode material have a radial distribution proportion larger than or equal to 60%, it is conducive to intercalation/deintercalation of lithium ions, and facilitate a conduction of internal stress caused by volumetric changes of crystal particles resulting from the charging and discharging during the cyclic process, thereby improving the cycle performance.

(2) The positive electrode material provided by the present disclosure comprises an oxide of M uniformly distributed to an inner portion and surface layer of the high nickel multi-element positive electrode material, the oxide can facilitate growth of (003) crystal plane in the primary sintered material, such that a length/diameter ratio of the primary crystal particles in the positive electrode material can be further increased, a radial distribution proportion of the primary crystal particles is further augmented.

(3) The positive electrode material provided by the present disclosure also comprises a cladding layer coated on an outer surface of the high nickel multi-element positive electrode material, such that the element N in the additive diffuses toward an inside of the positive electrode material during the roasting treatment process, it is conducive to the formation of the doped surface layer, and form an adhesive effect on an interface of the primary crystal particles, thereby further improving the cyclic performance of the positive electrode material.

DETAILED DESCRIPTION

Figure 1:
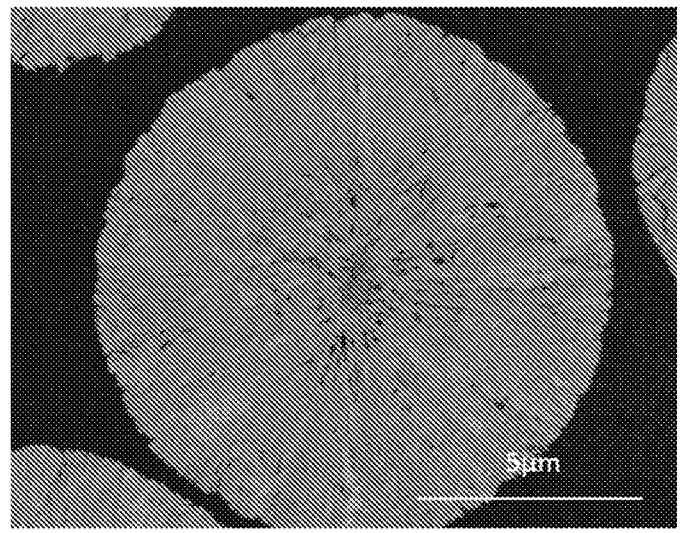
FIG. 1 illustrates a scanning electron microscope (SEM) photograph of the precursor prepared in Example 1.

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

In order to achieve the above objects, a first aspect of the present disclosure provides a positive electrode material for a lithium ion battery, comprising a high nickel multi-element positive electrode material, which is formed by agglomeration of a plurality of primary crystal particles, and the primary crystal particles are distributed in a diverging shape along a diameter direction of the high nickel multi-element positive electrode material;

wherein the primary crystal particles in the positive electrode material have a length/diameter ratio (L/R) larger than or equal to 3, and the primary crystal particles in the positive electrode material have a radial distribution proportion larger than or equal to 60%.

The inventors of the present disclosure have surprisingly discovered that:

(1) The method of preparing a positive electrode material provided by the present disclosure can cause the unsteady growth of a precursor during the synthesis process through the first synthesis and the second synthesis, wherein the second synthesis growth process is more conducive to the growth of the primary crystal particles in the precursor along a radial direction, such that the primary crystal particles in the prepared and obtained precursor have a length/diameter ratio larger than or equal to 1.5, and the primary crystal particles in the positive electrode material have a radial distribution proportion larger than or equal to 30%. When the precursor carries out reaction with a lithium source, the reaction activity is high, it facilitates diffusion of lithium and spread of an additive during the sintering process; in addition, an addition of a specific additive can promote growth of the primary crystal particles along (003) crystal plane, in combination with a specific precursor structure, the primary crystal particles in the obtained positive electrode material are distributed in a diverging shape along a radial direction, such that the primary crystal particles in the positive electrode material have a length/diameter ratio larger than or equal to 3, and the primary crystal particles in the positive electrode material have a radial distribution proportion larger than or equal to 60%, the arrangements are conducive to intercalation/deintercalation of lithium ions, and facilitate a conduction of internal stresses caused by volumetric changes of crystal particles resulting from the charging and discharging during the cyclic process, thereby improving the cycle performance.

(2) In the method of preparing a positive electrode material provided by the present disclosure, an additive M is added during the first roasting treatment process, the additive facilitates growth of (003) crystal plane in the primary sintered material, such that a length/diameter ratio of the primary crystal particles in the positive electrode material can be further increased, a radial distribution proportion of the primary crystal particles is further augmented.

(3) In the method of preparing a positive electrode material provided by the present disclosure, an additive N is added during the second roasting treatment process, such that the element N in the additive diffuses toward an inside of the positive electrode material during the roasting treatment process, it is conducive to the formation of the doped surface layer, and imposes an adhesive effect on an interface of the primary crystal particles, thereby further improving the cyclic performance of the positive electrode material.

Figure 6:
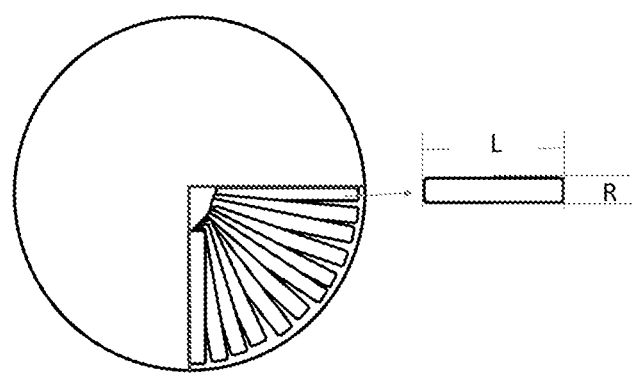
FIG. 6 illustrates a schematic diagram showing the length/diameter ratio of the multi-element material prepared in the present disclosure.

In the present disclosure, it shall be noted that the terms used herein are interpreted as follows:

The term "length/diameter ratio" refers to a ratio between the length L in the axial direction of primary crystal particles to the diameter R in the perpendicular axial direction of primary crystal particles, i.e., the numerical value of L/R, as shown in the schematic diagram of the length/diameter ratio of the multi-element material prepared in the present disclosure in FIG. 6.

The term "distributed in a diverging shape" refers to that the axial direction of the primary crystal particles coincides with the diametric direction of the high nickel multi-element positive electrode material.

The term "radial distribution proportion" denotes a proportion of the number of crystal particles distributed along a radial direction in the primary crystal particles relative to the total number of primary crystal particles.

According to the present disclosure, it is preferable that the primary crystal particles in the positive electrode material have a length/diameter ratio within a range of 3-5, and the primary crystal particles in the positive electrode material have a radial distribution proportion within a range of 60%-85%; and more preferably, the primary crystal particles in the positive electrode material have a length/diameter ratio within a range of 4-5, and the primary crystal particles in the positive electrode material have a radial distribution proportion within a range of 75%-83%. It shall be noted in the present disclosure that, for example, "the primary crystal particles in the positive electrode material have a radial distribution proportion within a range of 60%-85%" means that "a proportion of the number of crystal particles distributed along a radial direction in the primary crystal particles relative to the total number of primary crystal particles is within a range of 60%-85%".

According to the present disclosure, the composition of the high nickel multi-element positive electrode material is represented by a general formula $Li_{1+a}(Ni_{1-x-y}Co_xA_y)O_2$.

Wherein $-0.5 \leq a \leq 0.5$, $0<x \leq 0.2$, $0<y \leq 0.2$; A is Al and/or Mn; preferably $0.01 \leq a \leq 0.05$, $0.09 \leq x \leq 0.11$, $0.03 \leq y \leq 0.06$; A is Mn.

In accordance with the present disclosure, the positive electrode material further comprises an oxide of M uniformly distributed to an inner portion and a surface layer of the high-nickel multi-element positive electrode material, wherein the M is one or more selected from the group consisting of boron (B), aluminum (Al), tungsten (W), niobium (Nb), cerium (Ce) and strontium (Sr); preferably, the oxide of M is one or more selected from the group consisting of $WO_3$ nanopowder, $B_2O_3$ nanopowder, $Nb_2O_5$ nanopowder and $H_3BO_3$ nanopowder.

According to the present disclosure, the oxide of M has a particle size within a range of 30 nm-2 m, and in order to achieve a better doping effect, preferably the oxide of M has a particle size within a range of 50 nm-1 m, more preferably 50 nm-300 nm.

According to the present disclosure, the oxide of M is contained in an amount of 0.1-0.8 mol %, based on a total mole number of the positive electrode material, and in order to produce a better doping effect, the content is preferably within a range of 0.1-0.5 mol %, more preferably 0.2-0.3 mol %.

According to the present disclosure, the positive electrode material further comprises a cladding layer coated on an outer surface of the high nickel multi-element positive electrode material; wherein the cladding layer comprises an oxide of N, wherein the N is one or more selected from the group consisting of nickel (Ni), cobalt (Co), manganese (Mn), titanium (Ti), vanadium (V), niobium (Nb), molybdenum (Mo), cerium (Ce), aluminum (Al), barium (Ba), yttrium (Y) and zirconium (Zr).

According to the present disclosure, the oxide of N has a particle size within a range of 30 nm-2 m, and in order to achieve the better reactivity and coating effect, preferably the oxide of N has a particle size within a range of 5 nm-1 m, more preferably 10-200 nm.

According to the present disclosure, the cladding layer has a thickness within a range of 0.01-0.1 m, preferably 0.01-0.05 m, more preferably 15-21 nm.

According to the present disclosure, the oxide of N is contained in an amount of 0.1-2.5 mol %, and in order to achieve the better reactivity and coating effect, preferably the oxide of N is contained in an amount of 0.1-2 mol %, more preferably 1-1.5 mol %, based on a total mole number of the positive electrode material.

According to the present disclosure, the composition of the positive electrode material is represented by the general formula $Li_{1+a}((Ni_{1-x-y}Co_xA_yM_p)N_z)O_2$, wherein $-0.5 \leq a \leq 0.5$, $0<x \leq 0.2$, $0<y \leq 0.2$, $0 \leq p \leq 0.008$, $0 \leq z \leq 0.02$; A is Al and/or Mn; N is one or more elements selected from the group consisting of Ni, Co, Mn, Ti, V, Nb, Mo, Ce, Al, Ba, Y and Zr. Preferably, $0.01 \leq a \leq 0.05$, $0.09 \leq x \leq 0.11$, $0.03 \leq y \leq 0.06$, $0.83 \leq 1-x-y \leq 0.88$, $0.002 \leq p \leq 0.006$, $0.01 \leq z \leq 0.015$; A is Mn, M is one or more selected from the group consisting of W, B and Nb, and N is one or more selected from the group consisting of Ni, Co and Mn.

According to the present disclosure, the particle size of the positive electrode material is within a range of 9-14 μm.

A second aspect of the present disclosure provides a method of preparing the aforementioned positive electrode material, including:

(1) contacting the Ni salt, A salt, Co salt with water to obtained a mixed salt solution;

(2) performing a first reaction by contacting the mixed salt solution with a first mixed solution comprising water, a complexing agent and a precipitant in a reaction kettle to obtain a first mixed slurry, and filtering the first mixed slurry to obtain a precursor crystal nucleus;

(3) performing a second reaction by contacting the precursor crystal nucleus, the mixed salt solution with a second mixed solution comprising water, a complexing agent and a precipitant in the reaction kettle to obtain a second mixed slurry, subjecting the second mixed slurry to filtration washing and heat treatment to obtain a precursor;

(4) mixing the precursor, a lithium source and an additive M and subjecting a mixture to a first roasting treatment to obtain a primary sintered material;

(5) blending the primary sintered material with an additive N and subjecting a mixture to a second roasting treatment to prepare a positive electrode material.

According to the present disclosure, each of the Ni salt, A salt and Co salt in step (1) is a soluble metal salt, which is one or more selected from the group consisting of sulfate, chloride and acetate, preferably sulfate.

According to the present disclosure, a molar ratio of the used amounts of the Ni salt, the Co salt and the A salt in terms of metal in step (1) is (60-95):(3-20): (1-20), preferably (60-90): (4-20): (1-10), more preferably (83-88): (3-11): (3-9), further more preferably (83-88): (9-11): (3-6). In the present disclosure, the used amounts of the Ni salt, the Co salt and the A salt are controlled within the aforementioned ranges, the arrangement can allow for a preferable capacity and cycle performance.

According to the present disclosure, a molar concentration of the mixed salt solution is within a range of 0.5-2 mol/L, preferably 1.5-2 mol/L. If the molar concentration of the mixed salt solution is controlled within the aforementioned range in the present disclosure, the solid content and growth time during the reaction process can be effectively controlled.

According to the present disclosure, the complexing agent ammonia solution has a molar concentration within a range of 4-12 mol/L, and the sodium hydroxide solution has a molar concentration within a range of 2-8 mol/L.

According to the present disclosure, performing a first reaction in step (2) by contacting the mixed salt solution with a first mixed solution comprising water, a complexing agent and a precipitant in a reaction kettle to obtain a first mixed slurry; it is preferable that during the preparation process of the precursor crystal nucleus, the complexing agent and the precipitant are initially added into a reaction kettle prior to the addition of the mixed solution, and the pH is maintained at a high level, wherein the reaction kettle is provided with pure water at a liquid level of 20-25%; the mixed solution is subsequently added, the mixed salt solution is added at a determined flow rate, an initial rotating speed of stirring shall be maintained at a high rotation speed; after the addition of the mixed salt solution, a particulate precipitate is formed and separated out under the combined action of the complexing agent and the precipitant, the ingredients Ni, Co and A of the initially added metal salt solution are precipitated in the forms of $P(OH)_2$, $PCO_3$ or $PC_2O_4$ (wherein P is one or more of Ni, Co and A) to form spherical particle seed crystals (i.e., precursor crystal nucleus), and the precursor crystal nucleus obtained from the reaction are subjected to suction filtration and reserved for use.

According to the present disclosure, a pH value of the first mixed solution in step (2) is within a range of 11.5-13, the pH is kept at a high level in order to suppress the growth of the particles during the first synthesis process, and facilitate the subsequent synthesis and nucleation; in addition, the high pH facilitates an increase of density of the particles.

In step (2) of the present disclosure, the first mixed solution is used in an amount of 20-30%, and the mixed salt solution is used in an amount of 15-20%, based on the total volume of the reaction kettle.

According to the present disclosure, the first reaction conditions in step (2) comprise: a flow rate of the mixed salt solution within a range of 1-5 L/h, a stirring rate of 500-600 r/min, a temperature of 40-80° C., a time of 2-10 h, and a pH value of 11.5-13; preferably, a flow rate of the mixed salt solution within a range of 1-2.5 L/h, a stirring rate of 600 r/min, a temperature of 50-80° C., a time of 6-10 h, and a pH value of 12-13. The small particle precursor crystal nucleus can be obtained by adding the mixed salt solution, the precipitant, and the complexing agent simultaneously into the reaction kettle and stirring the mixture. According to the present disclosure, the particle size $D_{50}$ of the precursor crystal nucleus in step (2) is within a range of 1-3 m, preferably 1-2 μm.

According to the present disclosure, during the precursor preparation and synthesis process in step (3), the precipitate formed from the metal salt gradually grows at the periphery of the precursor crystal nucleus without individual nucleation, all the particles grow simultaneously, thereby ensuring uniformity of the growth of each particle.

According to the present disclosure, the pH value of the second mixed solution in step (3) is within a range of 11-12.5.

According to the present disclosure, the second mixed solution is used in an amount of 150-200% and the mixed salt solution is used in an amount of 70-100%, based on the total volume of the reaction kettle.

According to the present disclosure, the second mixed slurry has a solid content within a range of 30-60%, preferably 40-60%, more preferably 40-45%; in the present disclosure, in order to increase the solid content of the second mixed slurry, when the slurry level in the reaction kettle during the reaction process reaches 80%, 20% of the slurry is discharged from the downside of the reaction kettle, the supernatant of the slurry formed after static settlement is dumped, and the remaining slurry is poured into the reaction kettle, so as to increase the solid content in the reaction kettle.

In the present disclosure, if the solid content in the second mixed slurry is controlled to be within the aforesaid range, it can increase the collisional probability of the precursor particles in the reaction kettle, thereby improving sphericity degree of the precursor, and allowing the precursor to have a smooth surface.

According to the present disclosure, the second reaction conditions comprise: a flow rate of the mixed salt solution within a range of 0.5-5 L/h, a stirring rate of 300-500 r/min, a temperature of 40-80° C., a time of 10-200 h, and a pH value of 11-13; preferably, a flow rate of the mixed salt solution within a range of 1-2.5 L/h, a stirring rate of 500 r/min, a temperature of 50-60° C., a time of 100-150 h, and a pH value of 11-12.5; further, the precursor has a particle size $D_{50}$ within a range of 9-18 m, preferably 9.5-11 m; furthermore, the primary crystal particles in the precursor have a length/diameter ratio within a range of 1.5-4, preferably 1.5-3, and the primary crystal particles in the precursor have a radial distribution proportion within a range of 30-50%; furthermore, the primary crystal particles in the precursor have a length/diameter ratio of 3, and the primary crystal particles in the precursor have a radial distribution proportion within a range of 40-50%.

According to the present disclosure, the complexing agent is one or more selected from the group consisting of Ethylene Diamine Tetraacetic Acid (EDTA), aqueous ammonia solution, ammonium chloride, ammonium sulphate, ammonium nitrate, ammonium fluoride, ammonium citrate, ammonium acetate and ethylenediamine. A molar ratio of the complexing agent to the total metal salt is typically (0.1-3):1; preferably (1-2):1; more preferably (1-1.5):1, wherein the total metal salt is the total mole number of the Ni salt, Co salt and A metal salts.

According to the present disclosure, the precipitant is selected from compounds containing $OH^-$ or $CO_3^{2-}$, such as one or more selected from the group consisting of sodium hydroxide, potassium hydroxide, ammonium carbonate, sodium bicarbonate, sodium carbonate and potassium carbonate. A molar ratio of the precipitant to the total metal salt is (1-3):1; preferably (1-2):1; more preferably (1.01-1.04):1, wherein the total metal salt is the total mole number of the Ni salt, Co salt and A metal salts.

According to the present disclosure, the conditions of heat treatment in the step (3) comprises: drying under a temperature condition of 90-130° C. for 1-20 hours in a vacuum environment or a blowing environment.

According to the present disclosure, a molar ratio of the precursor to the lithium source is 1: (0.95-1.05), the lithium source is lithium hydroxide.

According to the present disclosure, the conditions of first roasting treatment in step (4) comprise: a temperature of 500-1,100° C. and a time of 6-20 h, and preferably, sintering the mixture at 700-900° C. in an oxygen atmosphere or an atmosphere having an oxygen content larger than 25% for 8-18 h, and fracturing the sintered material to obtain a primary sintered material having the primary crystal particles radially distributed.

In accordance with the present disclosure, the additive M is the oxide and/or hydroxide particles corresponding to one or more elements selected from the group consisting of boron (B), aluminum (Al), tungsten (W), niobium (Nb), cerium (Ce) and strontium (Sr); preferably, the additive M is one or more of the corresponding oxides, hydroxides, carbonates, nitrates and sulfates of the aforesaid metallic elements; more preferably, the additive M is one or more selected from the group consisting of $WO_3$ nanopowder, $B_2O_3$ nanopowder, $Nb_2O_5$ nanopowder and $H_3BO_3$ nanopowder.

According to the present disclosure, the conditions of second roasting treatment in step (5) comprise: a temperature of 600-1,000° C. and a time of 6-20 h; and preferably, sintering the mixture at 650-900° C. in an oxygen atmosphere or an atmosphere having an oxygen content larger than 25% for 8-18 h, and grinding and dissociating the sintered material to obtain a positive electrode material.

According to the present disclosure, the additive N is the oxide and/or hydroxide particles of one or more selected from the group consisting of nickel (Ni), cobalt (Co), manganese (Mn), titanium (Ti), vanadium (V), niobium (Nb), molybdenum (Mo), cerium (Ce), aluminium (Al), barium (Ba), yttrium (Y) and zirconium (Zr); preferably the additive N is one or more of the corresponding oxides, hydroxides, carbonates, sulfates and nitrates of the aforesaid metallic elements; more preferably, the additive N is one or more selected from the group consisting of $Co(OH)_2$, $Ni(OH)_2$, $Mn(OH)_2$ and $Co_3O_4$.

According to the present disclosure, the positive electrode has a particle strength larger than or equal to 120 MPa, preferably within a range of 120-135 MPa. According to the present disclosure, the battery pole piece prepared with the material is capable of withstanding a higher rolling strength during the manufacturing process, and a higher particle strength is conducive to the improved cycle life of the battery; further, the particle strength of the positive electrode material comprising the aforementioned ingredients is greatly improved.

In a third aspect, the present disclosure provides a lithium ion battery, wherein the lithium ion battery comprises the aforementioned positive electrode material.

According to a particularly preferred embodiment of the present disclosure, a method of preparing a positive electrode material having a divergent structure provided by the present disclosure including:

(1) dissolving nickel sulfate, cobalt sulfate, manganese sulfate in pure water according to the molar ratio (83-88): (9-11): (3-6) of metals, to obtain a mixed salt solution having a concentration of 1.5-2 mol/L; producing an aqueous ammonia solution having a concentration of 4 mol/L as a complexing agent, and preparing a sodium hydroxide solution having a concentration of 8 mol/L as a precipitant;

(2) preparation of precursor crystal nucleus: adding a complexing agent and a precipitant cocurrently to a reaction kettle provided with a stirrer, wherein a pure water at a liquid level of 20-25% is placed in the reaction kettle, the materials are stirred to obtain a first mixed solution, wherein the first mixed solution is used in an amount of 20-30% based on the total volume of the reaction kettle, and the pH of the first mixed solution is adjusted to within a range of 11.5-13;

the first mixed slurry is obtained by feeding the mixed salt solution $L_1$ at a flow rate of 1-2.5 L/h and carrying out reaction under the protection of nitrogen gas atmosphere, wherein the mixed salt solution $L_1$ is used in an amount of 15-20% based on the total volume of the reaction kettle, the pH during the reaction process is controlled to 11.5-13, the reaction temperature is 50-80° C., a stirring rate is 500-600 r/min; a molar ratio of the complexing agent aqueous ammonia to the total metal salt is (1-1.5):1, a molar ratio of the precipitant to the total metal salt is (1.01-1.04):1, the reaction time is 6-10 h, the reactant is filtered to obtain a precursor crystal nucleus with a particle size $D_{50}$ of 1-2 m;

(3) preparation of the precursor: a second mixed solution including pure water, a complexing agent and a precipitant is added cocurrently into the reaction kettle provided with a stirrer to carry out reaction, wherein the second mixed solution is used in an amount of 150-200% based on the total volume of the reaction kettle, the pH of the second mixed solution is adjusted to within a range of 11-12.5, and the stirring speed is 500 r/min;

the precursor crystal nucleus and the mixed salt solution $L_1$ are added into the reaction kettle to carry out a second reaction, wherein the mixed salt solution $L_1$ is added at a flow rate of 1-2.5 L/h, wherein the mixed salt solution is used in an amount of 70-100% based on the total volume of the reaction kettle, a stirring speed is 500-600 r/min, the pH is controlled to 11-12.5, the reaction temperature is 60° C., the reaction time is 120-150 h, and the solution after the addition accounts for 30% of the total volume of the reaction kettle; when the solution level in the reaction kettle during the reaction process reaches 80%, 20% of the second mixed slurry is discharged from the downside of the reaction kettle, the supernatant of the slurry formed after static settlement is dumped, and the remaining slurry is poured into the reaction kettle, so as to increase the solid content in the reaction kettle; the feed rate of the solution and the growth rate of the precursor crystal nucleus are controlled, when the particle size $D_{50}$ grows to 9.5-11 m, the reaction time reaches 120-180 h, and the solid content in the reaction kettle reaches 40-50%, the precursor is precipitated, filtered and washed, and then dried at a temperature condition of 120° C. to obtain the precursor of the multi-element material.

(4) the precursor is sufficiently blended with lithium hydroxide according to a molar ratio of 1:1.01-1.05, the nanopowder of one or more of $WO_3$, $B_2O_3$, $Nb_2O_5$ and $H_3BO_3$ at an amount of 0.2 mol % is added. The temperature is maintained at 780-800° C. for 13-14 h under an oxygen gas atmosphere. The reaction product is naturally cooled, pulverized and sieved to obtain a primary sintered material, i.e., the agglomerate of the primary crystal particles having a radial distribution proportion larger than 60%;

(5) the primary sintered material is mixed with 1 mol % or 1.5 mol % of one or more of the nanopowder particles of $Co(OH)_2$, $Ni(OH)_2$, $Mn(OH)_2$ and $CO_3O_4$, and the added amount is 1.5 mol %, and the mixed materials are sintered at a temperature of 680-700° C. for 15-16 h.

The present disclosure will be described in detail with reference to examples.

In the following examples and comparative examples:

The parameters of scanning electron microscope (SEM) photograph were measured by a SEM with a model No. S4800 purchased from the manufacture Hitachi Corporation Ltd. in Japan;

The capacity retention rate was measured with an instrument having a name "High Precision Battery Tester" and a model number CT4008, commercially available from the manufacture NEWARE Technology Limited.

Example 1

The Example served to describe a positive electrode material having a diverging structure produced with the preparation method of the present disclosure.

(1) Nickel sulfate, cobalt sulfate, manganese sulfate were dissolved in pure water according to the molar ratio 88:9:3 of metals, to obtain a mixed salt solution $L_1$ having a concentration of 2.0 mol/L; an aqueous ammonia solution having a concentration of 4 mol/L was produced as a complexing agent, and a sodium hydroxide solution having a concentration of 8 mol/L was prepared as a precipitant;

(2) preparation of precursor crystal nucleus: an aqueous ammonia solution and a sodium hydroxide solution were added cocurrently to a reaction kettle provided with a stirrer, wherein a pure water at a liquid level of 25% was placed in the reaction kettle to obtain a first mixed slurry, wherein the first mixed solution was used in an amount of 20% based on the total volume of the reaction kettle, and the pH of the first mixed solution was adjusted to 13.2;

the first mixed slurry was obtained by feeding the mixed salt solution $L_1$ at a flow rate of 2.5 L/h and carrying out reaction under the protection of nitrogen gas atmosphere, wherein the mixed salt solution $L_1$ was used in an amount of 20% based on the total volume of the reaction kettle, the pH during the reaction process was controlled to 13, the reaction temperature was 50° C., the stirring rate was 600 r/min; a molar ratio of complexing agent aqueous ammonia to total metal salt was 1:1, a molar ratio of the precipitant sodium hydroxide to the total metal salt was 1.01:1, the reaction time was 10 h, the reactant was filtered to obtain the precursor crystal nucleus;

(3) preparation of the precursor: a second mixed solution including pure water, aqueous ammonia solution and sodium hydroxide was added cocurrently into the reaction kettle provided with a stirrer to carry out reaction, wherein the second mixed solution was used in an amount of 150% based on the total volume of the reaction kettle, the pH of the second mixed solution was adjusted to 12.5, and the stirring speed was 600 r/min;

the precursor crystal nucleus and the mixed salt solution $L_1$ were added into the reaction kettle to carry out a second reaction, wherein the mixed salt solution $L_1$ was added at a flow rate of 2.5 L/h, wherein the mixed salt solution was used in an amount of 80% based on the total volume of the reaction kettle, a stirring speed was 600 r/min, the pH was controlled to 12.5, the reaction temperature was 60° C., the reaction time was 120 h, and the solution after the addition accounted for 30% of the total volume of the reaction kettle; when the solution level in the reaction kettle during the reaction process reached 80%, 20% of the second mixed slurry was discharged from the downside of the reaction kettle, the supernatant of the slurry formed after static settlement was dumped, and the remaining slurry was poured into the reaction kettle, so as to increase the solid content in the reaction kettle; the feed rate of the solution and the growth rate of the precursor crystal nucleus were controlled, when the particle size $D_{50}$ grew to 9.5 m, the reaction time reached 120 h, and the solid content in the reaction kettle reached 45%, the precursor was precipitated, filtered and washed, and then dried at a temperature condition of 120° C. to obtain a precursor of the multi-element material;

(4) the precursor was sufficiently blended with lithium hydroxide according to a molar ratio of 1:1.05, the nanopowder of $WO_3$ at an amount of 0.2 mol % was added. The temperature was maintained at 780° C. for 14 h under an oxygen gas atmosphere. The reaction product was naturally cooled, pulverized and sieved to obtain a primary sintered material, i.e., the agglomerate of the primary crystal particles having a radial distribution proportion larger than 60%;

(5) the primary sintered material was mixed with 1 mol % of the nanopowder particles of $Co(OH)_2$, and the added amount was 1.5 mol %, and the mixed materials were sintered at a temperature of 680° C. for 15 h.

The positive electrode material S1 was finally prepared, wherein the positive electrode material S1 was presented by a chemical formula:

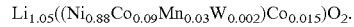

$Li_{1.05}((Ni_{0.88}Co_{0.09}Mn_{0.03}W_{0.002})Co_{0.015})O_2$.

The properties of the positive electrode materials were illustrated in Table 2.

In addition, FIG. 1 illustrated a SEM photograph of the precursor for lithium ion battery prepared in Example 1, as can be seen from FIG. 1, the primary particles of the precursor prepared with the preparation method were radially distributed.

Figure 2:
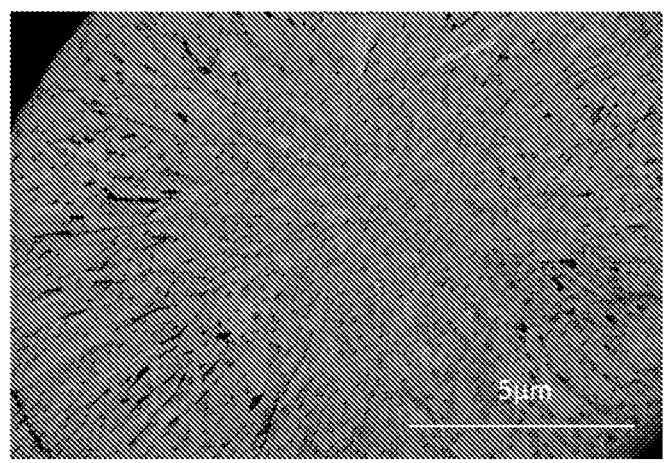
FIG. 2 shows a cross-sectional SEM photograph of the positive electrode material prepared in Example 1.

FIG. 2 illustrated a cross-sectional SEM photograph of the positive electrode material prepared in Example 1, as can be seen from FIG. 2, the primary particles of the positive electrode material prepared with the preparation method were radially distributed.

Moreover, as shown from the comparison of FIG. 1 and FIG. 2, the primary particles in the precursor prepared with the process of Example 1 were distributed in a diverging shape as illustrated in FIG. 1, the internal structure and effect shown in FIG. 2 can be achieved by doping and cladding process of Example 1, so that the primary crystal particles in the particles of the positive electrode material had a significantly increased length/diameter ratio, and a more remarkable diverging shape.

Example 2

The Example served to describe a positive electrode material having a diverging structure produced with the preparation method of the present disclosure.

(1) Nickel sulfate, cobalt sulfate, manganese sulfate were dissolved in pure water according to the molar ratio 83:11:6 of metals, to obtain a mixed salt solution $L_2$ having a concentration of 2.0 mol/L; an aqueous ammonia solution having a concentration of 4 mol/L was produced as a complexing agent, and a sodium hydroxide solution having a concentration of 8 mol/L was prepared as a precipitant;

(2) preparation of precursor crystal nucleus: an aqueous ammonia solution and a sodium hydroxide solution were added cocurrently to a reaction kettle provided with a stirrer, wherein a pure water at a liquid level of 25% was placed in the reaction kettle to obtain a first mixed slurry, wherein the first mixed solution was used in an amount of 25% based on the total volume of the reaction kettle, and the pH of the first mixed solution was adjusted to 11.6;

the first mixed slurry was obtained by feeding the mixed salt solution $L_2$ at a flow rate of 2.2 L/h and carrying out reaction under the protection of nitrogen gas atmosphere, wherein the mixed salt solution $L_2$ was used in an amount of 20% based on the total volume of the reaction kettle, the pH during the reaction process was controlled to 11.5, the reaction temperature was 60° C., the stirring rate was 600 r/min; a molar ratio of complexing agent aqueous ammonia to total metal salt was 1:1, a molar ratio of the precipitant sodium hydroxide to the total metal salt was 1.04:1, the reaction time was 6 h, the reactant was filtered to obtain the precursor crystal nucleus;

(3) preparation of the precursor: a second mixed solution including pure water, aqueous ammonia solution and sodium hydroxide was added cocurrently into the reaction kettle provided with a stirrer to carry out reaction, wherein the second mixed solution was used in an amount of 170% based on the total volume of the reaction kettle, the pH of the second mixed solution was adjusted to 12, and the stirring speed was 600 r/min;

the precursor crystal nucleus and the mixed salt solution $L_2$ were added into the reaction kettle to carry out a second reaction, wherein the mixed salt solution $L_2$ was added at a flow rate of 2 L/h, wherein the mixed salt solution was used in an amount of 80% based on the total volume of the reaction kettle, a stirring speed was 600 r/min, the pH was controlled to 12, the reaction temperature was 60° C., the reaction time was 180 h, and the solution after the addition accounted for 30% of the total volume of the reaction kettle; when the solution level in the reaction kettle during the reaction process reached 80%, 20% of the second mixed slurry was discharged from the downside of the reaction kettle, the supernatant of the slurry formed after static settlement was dumped, and the remaining slurry was poured into the reaction kettle, so as to increase the solid content in the reaction kettle; the feed rate of the solution and the growth rate of the precursor crystal nucleus were controlled, when the particle size $D_{50}$ grew to 11 m, the reaction time reached 180 h, and the solid content in the reaction kettle reached 50%, the precursor was precipitated, filtered and washed, and then dried at a temperature condition of 120° C. to obtain a precursor of the multi-element material;

(4) the precursor was sufficiently blended with lithium hydroxide according to a molar ratio of 1:1.05, the nanopowder of $WO_3$ at an amount of 0.2 mol % was added. The temperature was maintained at 780° C. for 14 h under an oxygen gas atmosphere. The reaction product was naturally cooled, pulverized and sieved to obtain a primary sintered material, i.e., the agglomerate of the primary crystal particles having a radial distribution proportion larger than 60%;

(5) the primary sintered material was mixed with 1.5 mol % of the nanopowder particles of $Ni(OH)_2$, and the added amount was 1.5 mol %, and the mixed materials were sintered at a temperature of 680° C. for 15 h.

The positive electrode material S2 was finally prepared, wherein the positive electrode material S2 was presented by a chemical formula:

$$Li_{1.05}((Ni_{0.83}Co_{0.11}Mn_{0.06}W_{0.002})Ni_{0.015})O_2.$$

The properties of the positive electrode materials were illustrated in Table 2.

Example 3

The Example served to describe a positive electrode material having a diverging structure produced with the preparation method of the present disclosure.

The positive electrode material was prepared according to the same method in Example 1, except that in step (4), the precursor was sufficiently blended with lithium hydroxide according to a molar ratio of 1:1.05, the nanopowder of $B_2O_3$ at an amount of 0.2 mol % was added. The temperature was maintained at 800° C. for 14 h under an oxygen gas atmosphere. The reaction product was naturally cooled, pulverized and sieved to obtain a primary sintered material, i.e., the agglomerate of the primary crystal particles having a radial distribution proportion larger than 60%.

The primary sintered material was mixed with 1.5 mol % of the nanopowder particles of $Mn(OH)_2$, and the added amount was 1.5 mol %, and the mixed materials were sintered at a temperature of 680° C. for 15 h.

The positive electrode material S3 was finally prepared, wherein the positive electrode material S3 was presented by a chemical formula:

$$Li_{1.5}((Ni_{0.88}Co_{0.09}Mn_{0.03}B_{0.004})Mn_{0.015})O_2.$$

The properties of the positive electrode materials were illustrated in Table 2.

Example 4

The Example served to describe a positive electrode material having a diverging structure produced with the preparation method of the present disclosure.

The positive electrode material was prepared according to the same method in Example 1, except that in step (4), the precursor was sufficiently blended with lithium hydroxide according to a molar ratio of 1:1.05, the nanopowder of $Nb_2O_5$ at an amount of 0.3 mol % was added. The temperature was maintained at 795° C. for 14 h under an oxygen gas atmosphere. The reaction product was naturally cooled, pulverized and sieved to obtain a primary sintered material, i.e., the agglomerate of the primary crystal particles having a radial distribution proportion larger than 60%.

The primary sintered material was mixed with the nanopowder particles of $Co(OH)_2$, and the added amount was 1.5 mol %, and the mixed materials were sintered at a temperature of 680° C. for 15 h.

The positive electrode material S4 was finally prepared, wherein the positive electrode material S4 was presented by a chemical formula:

$$Li_{1.05}((Ni_{0.88}Co_{0.09}Mn_{0.03}Nb_{0.006})Co_{0.015})O_2.$$

The properties of the positive electrode materials were illustrated in Table 2.

Example 5

The Example served to describe a positive electrode material having a diverging structure produced with the preparation method of the present disclosure.

The positive electrode material was prepared according to the same method in Example 1, except that in step (4), the precursor was sufficiently blended with lithium hydroxide according to a molar ratio of 1:1.05, the nanopowder of $H_3BO_3$ at an amount of 0.2 mol % was added. The temperature was maintained at 780° C. for 14 h under an oxygen gas atmosphere. The reaction product was naturally cooled, pulverized and sieved to obtain a primary sintered material, i.e., the agglomerate of the primary crystal particles having a radial distribution proportion larger than 60%.

The primary sintered material was mixed with the nanopowder particles of $Co_3O_4$, and the Co element was added in an amount of 1.5 mol %, and the mixed materials were sintered at a temperature of 680° C. for 15 h.

The positive electrode material S5 was finally prepared, wherein the positive electrode material S5 was presented by a chemical formula:

$$Li_{1.05}((Ni_{0.88}Co_{0.09}Mn_{0.03}B_{0.002})Co_{0.015})O_2.$$

The properties of the positive electrode materials were illustrated in Table 2.

Comparative Example 1

The positive electrode material was prepared according to the same method in Example 1, except that in step (4), the precursor was sufficiently blended with lithium hydroxide according to a molar ratio of 1:1.05, the temperature was maintained at 780° C. for 14 h under an oxygen gas atmosphere, to obtain a primary sintered material.

The positive electrode material D1 was finally prepared, wherein the positive electrode material D1 was presented by a chemical formula:

$Li_{1.05}((Ni_{0.88}Co_{0.09}Mn_{0.03})Co_{0.015})O_2$.

The properties of the positive electrode materials were illustrated in Table 2.

Figure 3:
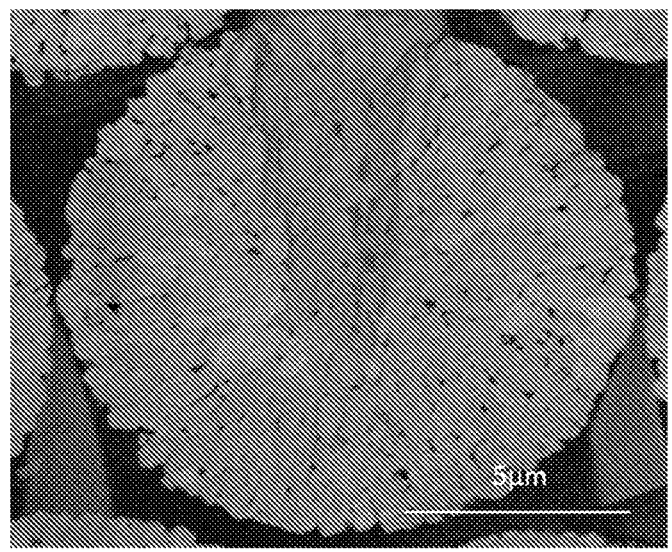
FIG. 3 illustrates a cross-sectional SEM photograph of the positive electrode material prepared in Comparative Example 1.

In addition, FIG. 3 illustrated a cross-sectional SEM photograph of the positive electrode material prepared in Comparative Example 1, as can be seen from FIG. 3, the radial distribution proportion of the primary crystal particles in the positive electrode material prepared according to FIG. 3 was lower than that of Example 1.

Comparative Example 2

The positive electrode material was prepared according to the same method in Example 1, except that in step (5), the primary sintered material was prepared and then cladded with LiF at an amount of 0.2 mol %, and sintered at 400° C. for 10 h.

The positive electrode material D2 was finally prepared, wherein the positive electrode material D2 was presented by a chemical formula:

$Li_{1.05}((Ni_{0.88}Co_{0.09}Mn_{0.03}W_{0.002})F_{0.002})O_2$.

The properties of the positive electrode materials were illustrated in Table 2.

Figure 4:
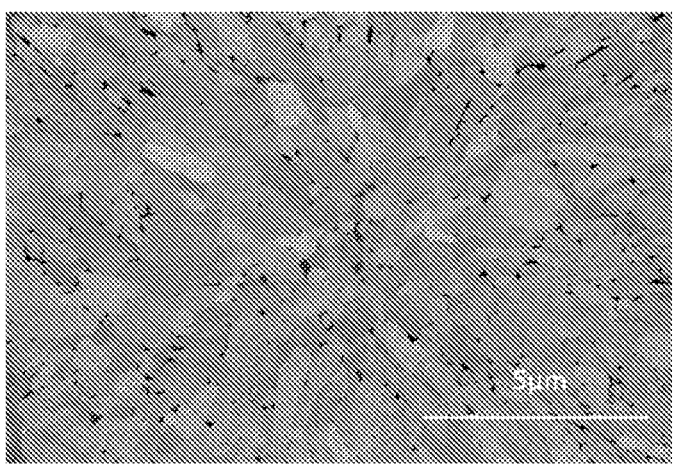
FIG. 4 illustrates a cross-sectional SEM photograph of the positive electrode material prepared in Comparative Example 2.

In addition, FIG. 4 illustrated a cross-sectional SEM photograph of the positive electrode material prepared in Comparative Example 2; as can be seen from FIG. 4, the radial distribution proportion of the primary crystal particles in the positive electrode material prepared according to FIG. 4 was lower than that of Example 1.

Figure 5:
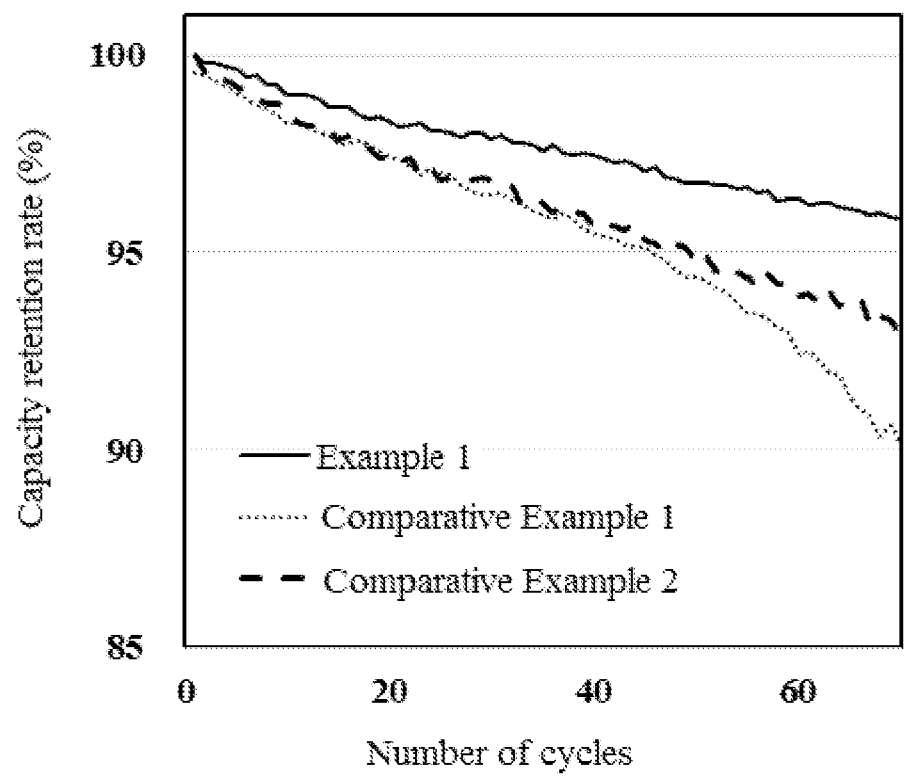
FIG. 5 is a schematic diagram showing the relationship between the number of cycles and the capacity retention ratio of Example 1, Comparative Example 1 and Comparative Example 2.

FIG. 5 illustrated a schematic diagram showing the relationship between the number of cycles and the capacity retention ratio of Example 1, Comparative Example 1 and Comparative Example 2; as can be seen from FIG. 5, the cycle retention rate of Example 1 was the best, followed by the cycle retention rate of Comparative Example 1, the cycle retention rate of Comparative Example 2 was the worst.

Comparative Example 3

The positive electrode material was prepared according to the same method in Example 1, except that the condition of an additive used for the second sintering and cladding process was changed to 0.5 mol of $B_2O_3$.

The positive electrode material D3 was finally prepared, wherein the positive electrode material D3 was presented by a chemical formula:

$Li_{1.05}((Ni_{0.88}Co_{0.09}Mn_{0.03}W_{0.002})B_{0.01})O_2$.

The properties of the positive electrode materials were illustrated in Table 2.

Comparative Example 4

The positive electrode material was prepared according to the same method in Example 1, except that in step (4), the temperature was maintained for 25 h.

The positive electrode material D4 was finally prepared, wherein the positive electrode material D4 was presented by a chemical formula:

$Li_{1.05}((Ni_{0.88}Co_{0.09}Mn_{0.03}W_{0.002})Co_{0.015})O_2$.

The properties of the positive electrode materials were illustrated in Table 2.

Comparative Example 5

The positive electrode material was prepared according to the same method in Example 1, except that in step (5), the temperature was 500° C.

The positive electrode material D5 was finally prepared, wherein the positive electrode material D5 was presented by a chemical formula:

$Li_{1.05}((Ni_{0.88}Co_{0.09}Mn_{0.03}W_{0.002})Co_{0.015})O_2$.

The properties of the positive electrode materials were illustrated in Table 2.

Comparative Example 6

The positive electrode material was prepared according to the same method in Example 1, except that the step (2) with respect to preparation of the precursor crystal nucleus was not performed, the step (3) with respect to preparation of the precursor was directly carried out, the primary crystal particles in the prepared precursor had a length/diameter ratio about 1, and the primary crystal particles in the precursor had irregular shape. The subsequent steps were identical with those of Example 1. The positive electrode material D6 was finally prepared, wherein the positive electrode material D6 was presented by a chemical formula:

$Li_{1.05}((Ni_{0.88}Co_{0.09}Mn_{0.03}W_{0.002})Co_{0.015})O_2$.

The properties of the positive electrode materials were illustrated in Table 2.

TABLE 1

| No. | Precursor * | # | positive electrode material * | # | Oxide of M-content-particle size(nm) | Oxide of N-content-particle size(nm)-thickness of cladding layer(nm) | Particle size of positive electrode material (μm) |
|---|---|---|---|---|---|---|---|
| S1 | 3 | 45 | 5 | 80 | $WO_3$-0.2 mol %-50 | $Co_3O_4$-1 mol %-200-15 | 12 |
| S2 | 3 | 45 | 5.5 | 75 | $WO_3$-0.2 mol %-50 | NiO-1.5 mol %-200-21 | 13 |
| S3 | 3 | 45 | 4 | 79 | $B_2O_3$-0.2 mol %-200 | $MnO_2$-1.5 mol %-200-21 | 14 |
| S4 | 3 | 45 | 4.5 | 83 | $Nb_2O_5$-0.3 mol %-300 | $Co_3O_4$-1.5 mol %-200-21 | 12 |
| S5 | 3 | 45 | 4.5 | 82 | $H_3BO_3$-0.3 mol %-200 | $Co_3O_4$-1.5 mol %-200-21 | 9 |
| D1 | 3 | 45 | 3 | 35 | / | $Co_3O_4$-1 mol %-200-16 | 12 |
| D2 | 3 | 45 | 5 | 80 | $WO_3$-0.2 mol %-50 | LiF-0.2 mol %-200-10 | 12 |
| D3 | 3 | 45 | 5 | 80 | $WO_3$-0.2 mol %-50 | $B_2O_3$-0.5 mol %-200-10 | 12 |
| D4 | 3 | 45 | 3 | 35 | $WO_3$-0.2 mol %-50 | $Co_3O_4$-1 mol %-200-10 | 12 |

TABLE 1-continued

| No. | Precursor * | # | positive electrode material * | # | Oxide of M-content- particle size(nm) | Oxide of N-content- particle size(nm)- thickness of cladding layer(nm) | Particle size of positive electrode material (μm) |
|---|---|---|---|---|---|---|---|
| D5 | 3 | 45 | 2 | 30 | $WO_3$-0.2 mol %-50 | $Co_3O_4$-1 mol %-200-10 | 12 |
| D6 | 1 | 5 | 1 | 10 | $WO_3$-0.2 mol %-50 | $Co_3O_4$-1 mol %-200-15 | 12 |

Note:
* denotes the length/diameter ratio of the primary crystal particles, # denotes the radial distribution proportion (%) of the primary crystal particles.

As can be seen from the results of Table 1, the positive electrode materials prepared by Examples 1-5 of the present disclosure are used, because of the M-oxide which are uniformly distributed inside and surface layer of the high-nickel multi-element positive electrode material, the M-oxide is conducive to the growth of (003) crystal plane in the primary sintered material, so that the length/diameter ratio of the primary crystal particles in the positive electrode material can be further increased, and the radial distribution proportion of the primary crystal particles can be further enhanced; in addition, the positive electrode material provided by the present disclosure also comprises a cladding layer coated on the outer surface of the high nickel multi-element positive electrode material, it can promote diffusion of the N element in the additive to an inside of the positive electrode material during the sintering process, so as to facilitate doping of the surface layers, thereby forming an adhesive function on an interface of the radially distributed primary crystal particles.

While in Comparative Examples 1-6, because the Comparative Example 1 does not use the primary sintering additive, the length/diameter ratio and radial distribution portion of the primary crystal particles of the material are inferior to those of Example 1; the Comparative Examples 2 and 3 respectively use two different nonmetallic compounds for cladding, the cycle retention rates of the cladding layer are poor. Comparative Example 4 has an excessively long time of maintaining temperature, it causes that the length/diameter ratio of the primary crystal particles is decreased, and the cycle performance is poor. Comparative Example 5 adopts a relatively low sintering temperature, such that the length/diameter ratio of the primary crystal particles of the material is decreased, the capacity is low and the effects are not desirable. Comparative Example 6 has undesirable effects because the length/diameter ratio and the radial distribution proportion of the precursor do not fall into the scopes defined by the present disclosure.

Test Example

The lithium ion batteries were prepared using the positive electrode materials prepared in Examples 1-5 and Comparative Examples 1-6, the specified method included the following aspects: the evaluation was performed by using a button type half cell, wherein the electrolyte used EC/DMC/EMC=1:1:1 and $LiPF_6$ concentration was 1.1 mol/L, the ratio of the positive electrode material: carbon black: Polyvinylidene Fluoride (PVDF) in the battery pole piece was 90:5:5. The compaction density of the pole piece was 3.5 g/cm³. The capacity of half cell was first tested by using 0.1 C charge-discharge test at a temperature of 25° C., and the cycle capacity of the material was tested by using 1 C charge-discharge test. The number of cycles was 80.

Moreover, the properties of the prepared lithium ion batteries were measured, and the measurement results are shown in Table 2, wherein the particle strength denoted the strength of the positive electrode material.

TABLE 2

| Items | Battery capacity (mAh/g) | Cycle retention rate (%) | Particle strength (MPa) |
|---|---|---|---|
| Lithium ion battery S1 | 215 | 96 | 120 |
| Lithium ion battery S2 | 213 | 95 | 135 |
| Lithium ion battery S3 | 215 | 94 | 120 |
| Lithium ion battery S4 | 214 | 94 | 122 |
| Lithium ion battery S5 | 212 | 94 | 121 |
| Lithium ion battery D1 | 209 | 93 | 93 |
| Lithium ion battery D2 | 210 | 90 | 100 |
| Lithium ion battery D3 | 211 | 87 | 98 |
| Lithium ion battery D4 | 210 | 80 | 110 |
| Lithium ion battery D5 | 193 | 94 | 77 |
| Lithium ion battery D6 | 211 | 81 | 87 |

As illustrated in Table 2, the lithium ion batteries prepared in Examples 1-5 have high cell capacity, excellent cycle performance, and greatly improved particle strength, the increased particle strength enhanced the workability of the material during the process of preparing the batteries, the battery pole piece prepared with the material can withstand higher rolling strength during the preparation process, and the higher particle strength was conducive to the improvement of the cycle life of the batteries.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations therefor shall also be regarded as the content disclosed by the present disclosure, each of them falls into the protection scope of the present disclosure.

The invention claimed is:
1. A positive electrode material for a lithium ion battery comprising a high nickel multi-element positive electrode material, which is formed by agglomeration of a plurality of primary crystal particles, and the primary crystal particles are distributed in a diverging shape along a diameter direc- tion of the high nickel multi-element positive electrode material, wherein the primary crystal particles in the positive electrode material have a length/diameter ratio L/R larger than or equal to 3, and the primary crystal particles in the positive electrode material have a radial distribution proportion larger than or equal to 60%.

2. The positive electrode material of claim 1, wherein the primary crystal particles in the positive electrode material have a length/diameter ratio within a range of 3-5, and the primary crystal particles in the positive electrode material have a radial distribution proportion within a range of 60%-85%.

3. The positive electrode material of claim 2, wherein the primary crystal particles in the positive electrode material have a length/diameter ratio within a range of 4-5, and the primary crystal particles in the positive electrode material have a radial distribution proportion within a range of 75%-83%.

4. The positive electrode material of claim 1, wherein the composition of the high nickel multi-element positive electrode material is represented by a general formula $Li_{1+a}(Ni_{1-x-y}Co_xA_y)O_2$; wherein $-0.5 \leq a \leq 0.5$, $0 < x \leq 0.2$, $0 < y \leq 0.2$; A is Al and/or Mn.

5. The positive electrode material of claim 1, wherein the positive electrode material further comprises an oxide of M uniformly distributed to an inner portion and a surface layer of the high-nickel multi-element positive electrode material, wherein the M is one or more selected from the group consisting of B, Al, W, Nb, Ce and Sr.

6. The positive electrode material of claim 5, wherein the oxide of M is contained in an amount of 0.1-0.8 mol %, based on a total mole number of the positive electrode material.

7. The positive electrode material of claim 5, wherein the positive electrode material further comprises a cladding layer coated on an outer surface of the high nickel multi-element positive electrode material; wherein the cladding layer comprises an oxide of N, wherein the N is one or more selected from the group consisting of Ni, Co, Mn, Ti, V, Nb, Mo, Ce, Al, Ba, Y and Zr.

8. The positive electrode material of claim 7, wherein the oxide of N has a particle size within a range of 30 nm-2μm.

9. The positive electrode material of claim 8, wherein the oxide of N is contained in an amount of 0.1-2.5 mol %, based on a total mole number of the positive electrode material.

10. The positive electrode material of claim 7, wherein the cladding layer has a thickness within a range of 0.01-0.1 μm.

11. The positive electrode material of claim 1, wherein the positive electrode has a particle strength larger than or equal to 120 MPa.

12. A lithium ion battery, it is characterized in that the lithium ion battery comprises the positive electrode material of claim 1.

13. A method of preparing the positive electrode material of claim 1, including:
(1) contacting the Ni salt, A salt, Co salt with water to obtain a mixed salt solution;
(2) performing a first reaction by contacting the mixed salt solution with a first mixed solution comprising water, a complexing agent and a precipitant in a reaction kettle to obtain a first mixed slurry, and filtering the first mixed slurry to obtain a precursor crystal nucleus;
(3) performing a second reaction by contacting the precursor crystal nucleus, the mixed salt solution with a second mixed solution comprising water, a complexing agent and a precipitant in the reaction kettle to obtain a second mixed slurry, subjecting the second mixed slurry to filtration washing and heat treatment to obtain a precursor;
(4) mixing the precursor, a lithium source and an additive M and subjecting a mixture to a first roasting treatment to obtain a primary sintered material;
(5) blending the primary sintered material with an additive N and subjecting a mixture to a second roasting treatment to prepare a positive electrode material.

14. The preparation method of claim 13, wherein a molar ratio of the used amounts of the Ni salt, the Co salt and the A salt in terms of metal in step (1) is (60-95): (3-20): (1-20).

15. The preparation method of claim 13, wherein a pH value of the first mixed solution in step (2) is within a range of 11.5-13.

16. The preparation method of claim 13, wherein the first reaction conditions comprise: a flow rate of the mixed salt solution within a range of 1-5 L/h, a stirring rate of 500-600 r/min, a temperature of 40-80° C., a time of 2-10 h, and a pH value of 11.5-13.

17. The preparation method of claim 13, wherein the precursor crystal nucleus has a particle size $D_{50}$ within a range of 1-3 μm.

18. The preparation method of claim 13, wherein the second reaction conditions comprise: a flow rate of the mixed salt solution within a range of 0.5-5 L/h, a stirring rate of 300-500 r/m in, a temperature of 40-80° C., a time of 10-200 h, and a pH value of 11-13.

19. The preparation method of claim 13, wherein the precursor has a particle size $D_{50}$ within a range of 9-18 μm.

20. The preparation method of claim 13, wherein the primary crystal particles in the precursor have a length/diameter ratio within a range of 1.5-4, and the primary crystal particles in the precursor have a radial distribution proportion within a range of 30%-50%.

* * * * *